(12) United States Patent
Yu et al.

(10) Patent No.: US 9,564,976 B2
(45) Date of Patent: Feb. 7, 2017

(54) BLIND EQUALIZATION OF DUAL SUBCARRIER OFDM SIGNALS

(71) Applicant: ZTE Corporation, Shenzhen (CN)

(72) Inventors: Jianjun Yu, Basking Ridge, NJ (US); Fan Li, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/829,583

(22) Filed: Aug. 18, 2015

(65) Prior Publication Data

US 2016/0112143 A1 Apr. 21, 2016

Related U.S. Application Data

(60) Provisional application No. 62/039,368, filed on Aug. 19, 2014.

(51) Int. Cl.
*H04B 10/06* (2006.01)
*H04B 10/61* (2013.01)
(Continued)

(52) U.S. Cl.
CPC ........ *H04B 10/6164* (2013.01); *H04B 10/612* (2013.01); *H04B 10/6165* (2013.01); *H04J 14/06* (2013.01); *H04L 1/0054* (2013.01); *H04L 25/03019* (2013.01); *H04L 27/2601* (2013.01); *H04L 27/2647* (2013.01); *H04L 27/2697* (2013.01); *H04L 27/34* (2013.01); *H04L 27/3422* (2013.01); *H04L 27/362* (2013.01); *H04L 27/3818* (2013.01); *H04L 27/3827* (2013.01); *H04L 2025/0342* (2013.01); *H04L 2025/03414* (2013.01);
(Continued)

(58) Field of Classification Search
CPC .............. H04B 10/612; H04B 10/6164; H04B 10/6165; H04L 27/2601; H04L 27/2647; H04L 27/362; H04L 27/34
USPC ........................................ 398/208, 79, 183
See application file for complete search history.

(56) References Cited

U.S. PATENT DOCUMENTS 6,493,397 B1 12/2002 Takahashi et al.
9,225,455 B2 * 12/2015 Yu ........................... H04J 14/02
(Continued)

FOREIGN PATENT DOCUMENTS

JP 09-238173 A 9/1997
JP 11-196146 A 7/1999

OTHER PUBLICATIONS

Zhang et al: "Multi-Modulus Blind Equalizations for Coherent Quadrature Duobinary Spectrum Shaped PM-QPSK Digital Signal Processing", Journal of Light Wave Technology, vol. 31, No. 7, Apr. 1, 2013, pp. 1073-1078.*

(Continued)

*Primary Examiner* — Li Liu
(74) *Attorney, Agent, or Firm* — Perkins Coie LLP

(57) ABSTRACT

A dual-polarization, 2-subcarriers code orthogonal, orthogonal frequency division multiplexed signal carrying information bits is transmitted in an optical communication network without transmitting a corresponding pilot tone or training sequence. A receiver receives the transmitted signal and recovers information bits using a blind equalization technique and by equalizing the 2-subcarriers OFDM signal as a 49-QAM signal in time domain with a CMMA (constant multi modulus algorithm) equalization method.

27 Claims, 10 Drawing Sheets

(51) Int. Cl.
| | |
|---|---|
| H04L 27/38 | (2006.01) |
| H04L 25/03 | (2006.01) |
| H04L 1/00 | (2006.01) |
| H04J 14/06 | (2006.01) |
| H04L 27/26 | (2006.01) |
| H04L 27/36 | (2006.01) |
| H04L 27/34 | (2006.01) |
| H04L 27/00 | (2006.01) |

(52) U.S. Cl.
CPC ........... *H04L 2025/03675* (2013.01); *H04L 2027/003* (2013.01); *H04L 2027/0038* (2013.01)

(56) References Cited

U.S. PATENT DOCUMENTS

| | | | |
|---|---|---|---|
| 9,264,144 B2* | 2/2016 | Yu | H04L 27/18 |
| 2005/0286908 A1 | 12/2005 | Way | |
| 2008/0123739 A1 | 5/2008 | Reznic et al. | |
| 2009/0190926 A1 | 7/2009 | Charlet et al. | |
| 2010/0098411 A1* | 4/2010 | Nakashima | H04B 10/60 398/25 |
| 2010/0111543 A1 | 5/2010 | Chow et al. | |
| 2010/0150577 A1 | 6/2010 | Essiambre et al. | |
| 2011/0002689 A1* | 1/2011 | Sano | H04B 10/69 398/44 |
| 2012/0148261 A1 | 6/2012 | Yu | |
| 2012/0155890 A1 | 6/2012 | Zhou et al. | |
| 2012/0163831 A1 | 6/2012 | Eiselt | |
| 2013/0089339 A1 | 4/2013 | Liu et al. | |
| 2013/0330070 A1* | 12/2013 | Yu | H04B 10/2507 398/16 |
| 2014/0233949 A1* | 8/2014 | Chien | H04B 10/532 398/65 |
| 2015/0093118 A1* | 4/2015 | Jia | H04B 10/0779 398/140 |
| 2015/0110492 A1* | 4/2015 | Yu | H04L 27/18 398/79 |
| 2015/0222368 A1 | 8/2015 | Yu | |
| 2016/0028577 A1* | 1/2016 | Yu | H04L 27/2659 398/76 |

OTHER PUBLICATIONS

Li et al: "Transmission and reception of Quad-Carrier QPSK-OFDM signal with blind equalization and overhead-free operation", Optics Express, vol. 21, Issue 25, Dec. 9, 2013, pp. 30999-31005.*
Armstrong, J., "OFDM for Optical Communications," Journal of Lightwave Technology, 27(3):189-204, Feb. 2009.
Cao, Z., et al. "Direct Detection Optical OFDM Transmission System Without Frequency Guard Band," IEEE Photonics Technology Letters, 22(11):736-738, Jun. 2010.
Chang, J.H., et al., "Filtering Tolerance of 108-Gb/s PolMux Quadrature Duobinary Signal on 25-GHz Grid," Optical Fiber Communication Conference and Exposition, and the National Fiber Optic Engineers Conference (OFC/NFOEC), Los Angeles, CA, Paper OMR4, pp. 1-3, Mar. 2011.
Chien, H.-C., et al., "Performance Assessment of Noise-suppressed Nyquist-WDM for Terabit Superchannel Transmission," Journal of Lightwave Technology, 30(24):3965-3971, Jul. 2012.
Dong, Z., et al., "7×224 Gb/s/ch Nyquist-WDM Transmission Over 1600-km SMF-28 Using PDM-CSRZ-QPSK Modulation", IEEE Photonics Technology Letters, 24(13):1157-1159, Jul. 2012.
Fatadin, I., et al., "Compensation of Frequency Offset for 16-QAM Optical Coherent Systems Using QPSK Partitioning", IEEE Photonics Technology Letters, 23(17):1246-1248, Sep. 2011.
Fatadin, I., et al., "Laser Linewidth Tolerance for 16-QAM Coherent Optical Systems Using QPSK Partitioning," IEEE Photonics Technology Letters, 22(9):631-633, May 2010.

Gao, Y., et al., "Low-Complexity Two-Stage Carrier Phase Estimation for 16-QAM Systems using QPSK Partitioning and Maximum Likelihood Detection," Optical Fiber Communication Conference and Exposition, and the National Fiber Optic Engineers Conference (OFC/NFOEC), Los Angeles, CA, Paper OMJ6, pp. 1-3, Mar. 2011.
Huang, M.-F., et al., "EDFA-Only WDM 4200-km Transmission of OFDM-16QAM and 32QAM," IEEE Photonics Technology Letters, 24(17):1466-1468, Sep. 2012.
Jansen, S.L., et al., "Coherent Optical 25.8-Gb/s OFDM Transmission Over 4160-km SSMF," Journal of Lightwave Technology, 26(1):6-15, Jan. 2008.
Jia, Z., et al., "Field Transmission of 100 G and Beyond: Multiple Baud Rates and Mixed Line Rates Using Nyquist-WDM Technology," Journal of Lightwave Technology, 30(24):3793-3804, Dec. 2012.
Kikuchi, K., et al., "Coherent Demodulation of Optical Quadrature Duobinary Signal with Spectral Efficiency of 4 bit/s/Hz per Polarization," 33rd European Conference and Exhibition of Optical Communication (ECOC), Berlin, Germany, Paper 9.3.4, pp. 1-2, Sep. 2007.
Kobayashi, T., et al., "Over 100 Gb/s Electro-Optically Multiplexed OFDM for High-Capacity Optical Transport Network," Journal of Lightwave Technology, 27(16):3714-3720, Aug. 2009.
Leven A., et al., "Frequency Estimation in Intradyne Reception," IEEE Photonics Technology Letters, 19(6):366-368, Mar. 2007.
Li, C., et al., "Investigation of Coherent Optical Multiband DFT-S OFDM in Long Haul Transmission," IEEE Photonics Technology Letters, 24(19):1704-1707, Oct. 2012.
Li, F., et al., "Blind equalization for dual-polarization two-subcarrier coherent QPSK-OFDM signals," Optics Express, 39(2):201-204, Jan. 2014.
Li, F., et al., "Transmission and reception of Quad-Carrier QPSK-OFDM signal with blind equalization and overhead-free operation," Optics Express, 21(25)30999-31005, Dec. 2013.
Li, J., et al., "Approaching Nyquist Limit in WDM Systems by Low-Complexity Receiver-Side Duobinary Shaping," Journal of Lightwave Technology, 30(11):1664-1676, Jun. 2012.
Li, J., et al., "Spectrally Efficient Quadrature Duobinary Coherent Systems With Symbol-Rate Digital Signal Processing", Journal of Lightwave Technology, 29(8)1098-1104, Apr. 2011.
Liu, X., et al., "448-Gb/s Reduced-Guard-Interval CO-OFDM Transmission Over 2000 km of Ultra-Large-Area Fiber and Five 80-GHz-Grid ROADMs," Journal of Lightwave Technology, 29(4):483-490, Feb. 2011.
Lowery, A.J., "Improving Sensitivity and Spectral Efficiency in Direct-Detection Optical OFDM Systems," Optical Fiber Communication Conference and Exposition, and the National Fiber Optic Engineers Conference (OFC/NFOEC), San Diego, CA, Paper OMM4, pp. 1-3, Feb. 2008.
Lyubomirsky, I., "Quadrature Duobinary for High-Spectral Efficiency 100G Transmission," Journal of Lightwave Technology, 28(1):91-96, Jan. 2010.
Lyubomirsky, I., "Quadrature Duobinary Modulation for 100G Transmission Beyond the Nyquist Limit," Optical Fiber Communication Conference and Exposition, and the National Fiber Optic Engineers Conference (OFC/NFOEC), San Diego, CA, Paper OThM4, pp. 1-3, Mar. 2010.
Machi, F., et al., "111-Gb/s PolMux-Quadrature Duobinary for Robust and Bandwidth Efficient Transmission," IEEE Photonics Technology Letters, 22(11):751-753, Jun. 2010.
Peng, W.R., et al., "Per-symbol-based digital back-propagation approach for PDM-CO-OFDM transmission systems," Optics Express, 21(2):1547-1554, Jan. 2013.
Peng, W.-R., et al., "Simple Carrier Recovery Approach for RF-Pilot-Assisted PDM-CO-OFDM Systems," Journal of Lightwave Technology, 31(15):2555-2564, Aug. 2013.
Pfau, T., et al., "Hardware-Efficient Coherent Digital Receiver Concept With Feedforward Carrier Recovery for M-QAM Constellations," Journal of Lightwave Technology, 27(8):989-999, Apr. 2009.
Sano, A. et al., "No-Guard-Interval Coherent Optical OFDM for 100-Gb/s Long-Haul WDM Transmission," Journal of Lightwave Technology, 27(16):3705-3713, Aug. 2009.

(56) References Cited

OTHER PUBLICATIONS

Shieh, W., et al., "Coherent optical OFDM: theory and design," Optics Express, 16(2):841-859, Jan. 2008.

Tao, L., et al., "Analysis of Noise Spread in Optical DFT-S OFDM Systems," Journal of Lightwave Technology, 30(20):3219-3225, Oct. 2012.

Viterbi, A., et al., "Nonlinear Estimation of PSK-Modulated Carrier Phase with Application to Burst Digital Transmission," IEEE Transactions on Information Theory, 29(4):543-551, Jul. 1983.

Wang, H., et al., "APSK Modulated CO-OFDM System With Increased Tolerance Toward Fiber Nonlinearities," IEEE Photonics Technology Letters, 24(13):1085-1087, Jul. 2012.

Winzer, P.J., et al., "Spectrally Efficient Long-Haul Optical Networking Using 112-Gb/s Polarization-Multiplexed 16-QAM," Journal of Lightwave Technology, 28(4):547-556, Feb. 2010.

Yang, Q., et al., "Guard-band influence on orthogonal-band-multiplexed coherent optical OFDM," Optics Letters, 33(19)2239-2241, Oct. 2008.

Yu, J., et al "1.96 Tb/s (21×100 Gb/s) OFDM Optical Signal Generation and Transmission Over 3200-km Fiber," IEEE Photonics Technology Letters, 23(15):1061-1063, Aug. 2011.

Yu, J., et al., "Field Trial Nyquist-WDM Transmission of 8×216. 4Gb/s PDM-CSRZ-QPSK Exceeding 4b/s/Hz Spectral Efficiency," Optical Fiber Communication Conference and Exposition, and the National Fiber Optic Engineers Conference (OFC/NFOEC), Los Angeles, CA, Paper PDP5D.3, pp. 1-3, Mar. 2012.

Yu, J., et al., "Transmission of 8×480-Gb/s super-Nyquist-filtering 9-QAM-like signal at 100 GHz-grid over 5000-km SMF-28 and twenty-five 100 GHz-grid ROADMs," Optics Express, 21(13):15686-15691, Jul. 2013.

Zhang, J., et al., "Improved Quadrature Duobinary System Performance Using Multi-Modulus Equalization," IEEE Photonics Technology Letters, 25(16):1630-1633, Aug. 2013

Zhang, J., et al., "Multi-Modulus Blind Equalizations for Coherent Quadrature Duobinary Spectrum Shaped PM-QPSK Digital Signal Processing," Journal of Lightwave Technology, 31(7):1073-1078, Apr. 2013.

Zhou, X., et al., "64-Tb/s, 8 b/s/Hz, PDM-36QAM Transmission Over 320 km Using Both Pre- and Post-Transmission Digital Signal Processing," Journal of Lightwave Technology, 29(4):571-577, Feb. 2011.

Zhou, X., et al., "Cascaded two-modulus algorithm for blind polarization de-multiplexing of 114-Gb/s PDM-8-QAM optical signals," Optical Fiber Communication Conference and Exposition, and the National Fiber Optic Engineers Conference (OFC/NFOEC), San Diego, CA, Paper OWG3, pp. 1-3, Mar. 2009.

Zhou, X., et al., "Multi-Level, Multi-Dimensional Coding for High-Speed and High-Spectral-Efficiency Optical Transmission," Journal of Lightwave Technology, 27(16):3641-3653, Aug. 2009.

Zhou, X., et al., "PDM-Nyquist-32QAM for 450-Gb/s Per-Channel WDM Transmission on the 50 GHz ITU-T Grid," Journal of Lightwave Technology, 30(4):553-559, Feb. 2012.

Zhou, X., et al., "Transmission of 32-Tb/s Capacity Over 580 km Using RZ-Shaped PDM-8QAM Modulation Format and Cascaded Multimodulus Blind Equalization Algorithm," Journal of Lightwave Technology, 28(4):456-465, Feb. 2010.

* cited by examiner

Table. The output data of Dual-subcarrier and Quad-subcarrier OFDM with different input modulation formats in time domain.

| Input data | Dual-subcarrier OFDM | Quad-subcarrier OFDM |
|---|---|---|
| QPSK | 9QAM | 25QAM |
| 8QAM | 15QAM | 88QAM |
| 16QAM | 49QAM | 169QAM |
| 32QAM | 109QAM | 401QAM |
| 64QAM | 225QAM | 841QAM |

*FIG. 2*

BLIND EQUALIZATION OF DUAL SUBCARRIER OFDM SIGNALS

CROSS REFERENCE TO RELATED APPLICATIONS

This patent document claims the benefit of U.S. Provisional Patent Application No. 62/039,368, filed Aug. 19, 2014. The entire content of the before-mentioned patent application is incorporated by reference as part of the disclosure of this document.

TECHNICAL FIELD

This patent document relates to digital communication and receiver signal processing.

BACKGROUND

With the advent of transmission of multimedia content such as video over the Internet and other communications networks, there is any ever-increasing need for increased data rate capacity on communication networks. Often, optical networks form backbones of communications networks, where the increased traffic at the edges of the network aggregates to several gigabit of network traffic. Therefore, optical communication techniques are being challenged to meet the demand on communications network data capacity. Laying down optical transmission media such as fiber optics often requires large amount of capital expenditure and may not always be a suitable options due to the expenses involved and other regulatory issues.

SUMMARY

The techniques disclosed in this document enable reception of dual subcarrier modulated orthogonal frequency division multiplexing (OFDM) modulated signals using blind equalization and without using pilot tones or reference signals. In one aspect, a constant modulus blind equalization algorithm is used to recover data from modulated signals.

In one aspect, techniques are disclosed to recover data from a two-subcarrier OFDM signal in which each subcarrier is modulated using a Quadrature Amplitude Modulation (QAM) constellation. A process of recovering data includes receiving the two-subcarrier OFDM signal, converting the two-subcarrier OFDM signal into a time domain QAM signal, and performing blind equalization of the time domain QAM signal to recover the data.

These and other aspects, and their implementations and variations are set forth in the drawings, the description and the claims.

BRIEF DESCRIPTION OF THE DRAWINGS

FIG. 2 depicts examples of constellations of input data and the corresponding output data of dual and quad subcarrier OFDM.

Like reference symbols in the various drawings indicate like elements.

DETAILED DESCRIPTION

Figure 1:
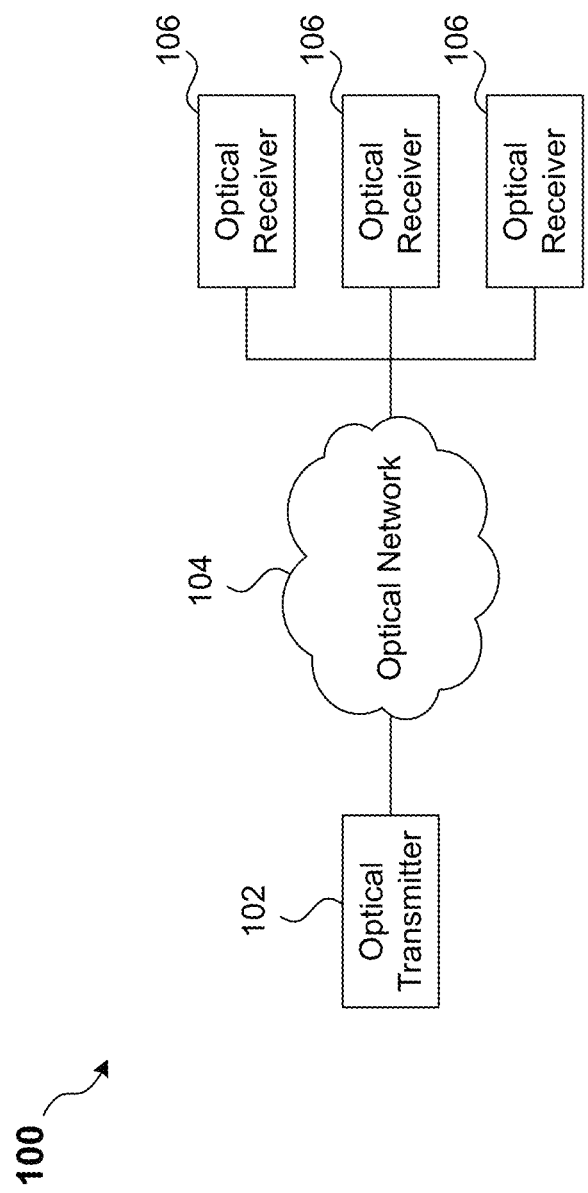
FIG. 1 depicts an architectural block diagram of an example of an optical communication system.

Coherent optical orthogonal frequency division multiplexing (CO-OFDM) has been extensively studied both in backbone networks and access networks due to its high spectral efficiency (SE) and robustness to transmission impairments enabled by advanced digital signal processing (DSP) in frequency domain. For traditional optical OFDM transmissions, the frequency offset and carrier phase are both estimated and compensated in the frequency domain with the aid of training sequences (TSs) and pilot tones. Moreover, the channel response estimation and equalization is typically performed in the frequency domain. Frequency domain equalization (FDE) is simple and effective, but it needs computational and spectral overhead during equalization which leads to the SE degradation.

Certain OFDM techniques, referred to as "few subcarriers OFDM" may use a limited number of subcarriers, e.g., Dual-subcarrier and Quad-subcarrier for signal transmission. Compared to conventional OFDM with a large number of subcarriers (e.g., 64, 128 or upwards), few subcarriers OFDM has the advantage of quite low peak-to-average power ratio (PAPR). In a few subcarriers OFDM implementation, the FDE based on TSs and pilot tones may not effectively work anymore for two reasons. First, the frequency resolution decreases in a few subcarriers OFDM scheme and this may lead to a significant decrease in channel estimation accuracy. Second, the SE is significantly reduced as the pilot tones should be inserted in every OFDM symbol with few subcarriers.

In some techniques, e.g., as disclosed in U.S. patent application Ser. No. 14/453,472, entitled "Reception of 2-subcarriers coherent orthogonal frequency division multiplexing signals," filed on Aug. 6, 2014, incorporated by reference in its entirety herein, QPSK OFDM signals with Dual-subcarrier and Quad-subcarrier are treated as 9QAM and 25QAM signals in the time domain, respectively. In this way, the QPSK OFDM signal with dual-subcarrier or quad-subcarrier can be equalized in the time domain with cascaded multi-modulus algorithm (CMMA) equalization method. Thus, the additional overhead in the FDE is avoided, but the SE is still limited as the modulation format is QPSK. In some implementations, CMMA can be applied to perform blind polarization de-multiplexing of optical signals.

The techniques disclosed in the present document can be used to, e.g., eliminate the use of pilot tones and training sequences that burden transmitted signals with non-data overhead. In some embodiments, receiver-side signal processing may convert received modulated OFDM signals into a constant modulus signal and use receiver side signal processing that performs blind equalization, e.g., without relying on a priori knowledge of signals such as in the case of pilot tones and training sequences. These, and other, advantages and aspects are described in the present document.

In the present document, several embodiments have been discussed with specific references to modulation and other physical layer parameter values. However, the general applicability of the principles discussed will be appreciated by one of skill in the art. Further, embodiments are discussed with reference to optical transmissions only for the sake of clarity and other transmission mediums, e.g., coaxial cable, copper wire, wireless, etc. may be used in various embodiments.

Using the described techniques, implementations can achieve 16-Gbaud Polarization-division-multiplexed (PDM) Dual-subcarrier coherent optical orthogonal frequency division multiplexing (CO-OFDM) transmission and reception without any bandwidth and computational overhead associated with pilot tones or training sequences. The In-phase and Quadrature (I/Q) components of Dual-subcarrier 16-ary quadrature amplitude modulation (16QAM) OFDM signal are seven-level signals, and thus can be equalized as 49QAM signal in the time domain with a cascaded multi-modulus algorithm (CMMA) equalization method. The performance comparison between optical back to back (OBTB) and after 80-km SMF-28 transmission is performed, and the results show that there is no power penalty observed. 0.6-dB optical signal to noise ratio (OSNR) penalty is observed when the bandwidth of channel is set at 25 GHz.

In another aspect, the present document discloses transmission and reception of 16-Gbaud Dual-subcarrier 16-ary quadrature amplitude modulation (16QAM) OFDM. In some embodiments, a dual-subcarrier 16QAM-OFDM signal is processed as a 49QAM signal in the time domain, and is blindly equalized with CMMA equalization method in the time domain. The overhead in the traditional optical OFDM transmission system can be completely removed in the dual-subcarrier optical 16QAM-OFDM transmission system with blind equalization. In one advantageous aspect over previous dual-subcarrier all-optical OFDM systems, the subcarriers in the presently disclosed techniques can be generated in the electrical domain instead of optical domain. In traditional dual-subcarrier all optical OFDM signal generation, two frequency-locked subcarriers are generated before signal modulation. The channel spacing between two subcarriers is exactly equal to the baud rate of each subchannel in order to make the 2-subcarrier orthogonal. The generation of such two subcarriers in the optical domain is thus usually complicated compared to the generation of subcarriers in the electrical domain, as can be done with the presently disclosed techniques.

Moreover, at the receiver, after optical to electrical (O/E) conversion, using the presently disclosed techniques, a digital filter can be used to separate the dual-subcarrier, and then DSP can be applied for each subcarrier. Thus, dual-subcarrier can be processed at the same time with the blind CMMA like a 49QAM, which can simplify receiver design.

FIG. 1 is a block diagram representation of an example of an optical communication system 100 where the subject technology of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 1 for clarity. The presently disclosed transmitter-side techniques may be implemented using transmitter electronics in apparatus 102 or 106. The presently disclosed receiver-side techniques may be implemented using receiver electronics in apparatus 102 or 106.

After a 2-point inverse fast Fourier transform (IFFT), the two samples of one dual-subcarrier OFDM symbol can be expressed as $$s(0) = \frac{1}{\sqrt{2}}(c_0 - c_1), \quad (1)$$

$$s(1) = \frac{1}{\sqrt{2}}(c_0 + c_1).$$

where $c_0$ and $c_1$ represent the input data with corresponding modulation formats modulated onto 2 subcarriers, respectively. Further, $s(0)$ and $s(1)$ denote the symbols after 2-point IFFT. Similarly, In the Quad-subcarrier OFDM case, the output of 4-point IFFT can be expressed as:

$$s(0) = \frac{1}{2}(c_0 + c_1 + c_2 + c_3), s(1) = \frac{1}{2}(c_0 + jc_1 - c_2 - jc_3), \quad (2)$$

$$s(2) = \frac{1}{2}(c_0 - c_1 + c_2 - c_3), s(3) = \frac{1}{2}(c_0 - jc_1 - c_2 + jc_3).$$

where and $c_0$, $c_1$, $c_2$ and $c_3$ represent the input data with corresponding modulation formats modulated onto 4-subcarrier, respectively. Further, $s(0)$ $s(1)$ $s(2)$ and $s(3)$ denote the corresponding 4 symbols after 4-point IFFT.

Using Eq. (1) and Eq. (2), output data (s values) for different modulation formats, can be obtained for dual-subcarrier and quad-subcarrier OFDM signals. FIG. 2 depicts an example table listing of input data (first column) and output data after 2-point IFFT (second column) and 4-point IFFT (third column). A QPSK constellation in the frequency domain is transformed to 9QAM and 25QAM constellations in the time domain after 2-point and 4-point IFFT, respectively. Similarly, 15QAM and 88QAM can be respectively obtained with 2-point and 4-point IFFT of rectangle 8QAM. Similarly, 16QAM input data is changed to 49QAM and 169QAM in the Dual-subcarrier and Quad-subcarrier scheme, respectively. The formats of output data of Dual-subcarrier and Quad-subcarrier OFDM with 32QAM are 109QAM and 401QAM in the time domain, respectively. 225QAM and 841QAM can be respectively obtained with 2-point and 4-point IFFT of 64QAM. While this patent document presents results for the transmission and reception of dual-subcarrier 16QAM-OFDM, which can be equalized as 49QAM signal in the time domain with CMMA equalization method, similar techniques can be implemented for the higher QAM constellations.

Figure 3:
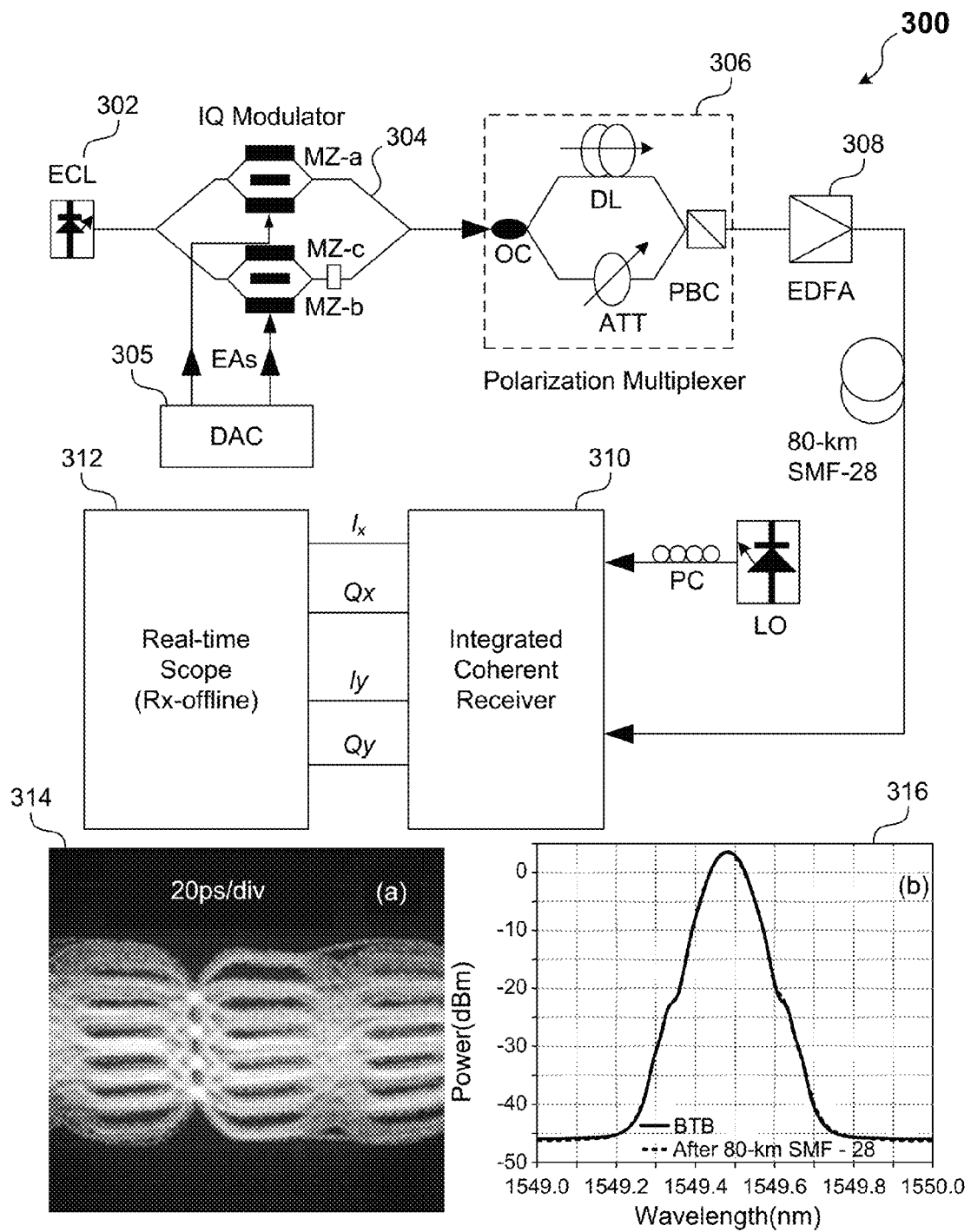
FIG. 3 shows an example of an experimental system in which performance of a communication receiver can be evaluated.

FIG. 3 shows an embodiment 300 of a dual-subcarrier coherent optical 16QAM-OFDM (CO-16QAM-OFDM) transmission system. At the transmitter, an external cavity laser (ECL, 302) at 1549.48 nm with less than 100-kHz linewidth and maximum output power of 14.5 dBm is modulated by intensity Mach-Zehnder modulator (MZM) driven by an electrical baseband OFDM signal (304). The dual-carrier 16QAM-OFDM signal is generated by a digitalto-analog convertor (DAC) with a 64-GSa/s sample rate (305). For example, in some embodiments, the dual-carrier 16QAM-OFDM signal may first be generated using a data modulation module, and then a 4-times interpolation is implemented to generate 16-Gbaud Dual-carrier 16QAM-OFDM signal. Two linear electrical amplifiers (EAs) are used to boost the dual-carrier 16QAM-OFDM signal before electrical to optical (E/O) conversion. For optical OFDM modulation, two parallel Mach-Zehnder modulators (MZMs) in the I/Q modulator are both biased at the null point and the phase difference between the upper and lower branches of the I/Q modulator is controlled at n/2.

An optional polarization multiplexing is realized by a polarization multiplexer 306, comprising a polarization-maintaining optical coupler (OC) to halve the signal into two branches, an optical delay line (DL) to remove the correlation between X-polarization and Y-polarization by providing a time delay, an optical attenuator to balance the power of two branches and a polarization beam combiner (PBC) to recombine the signals. The generated signal is boosted via an erbium doped fiber amplifier (EDFA) 308 before launched into 80-km SMF-28. The 80-km SMF-28 has 18-dB average loss and 17-ps/km/nm chromatic dispersion (CD) at 1550 nm without optical dispersion compensation.

The output signal is then injected into the integrated coherent receiver 310 to implement O/E (optical-electrical) detection. The data recovered from the receiver 310 may be used by receiver-side applications (e.g., user applications). For performance evaluation, after integrated coherent receiver, the signal may be captured by the real-time oscilloscope 312 with 80-GSa/s sample rate (for verification). The resolutions of DAC and analog-to-digital converter (ADC) in real-time oscilloscope are both 8 bits. An example of an electrical eye diagram of in-phase component of dual-subcarrier 16QAM-OFDM signal is inserted as inset (a) 314 in FIG. 3. The signal 314 shows 7 levels. An example of the optical spectra before and after 80-km SMF-28 transmission with 0.1-nm resolution are shown in FIG. 3, inset (b) 316, and there is no OSNR degradation observed after 80-km SMF-28 transmission.

Figure 4:
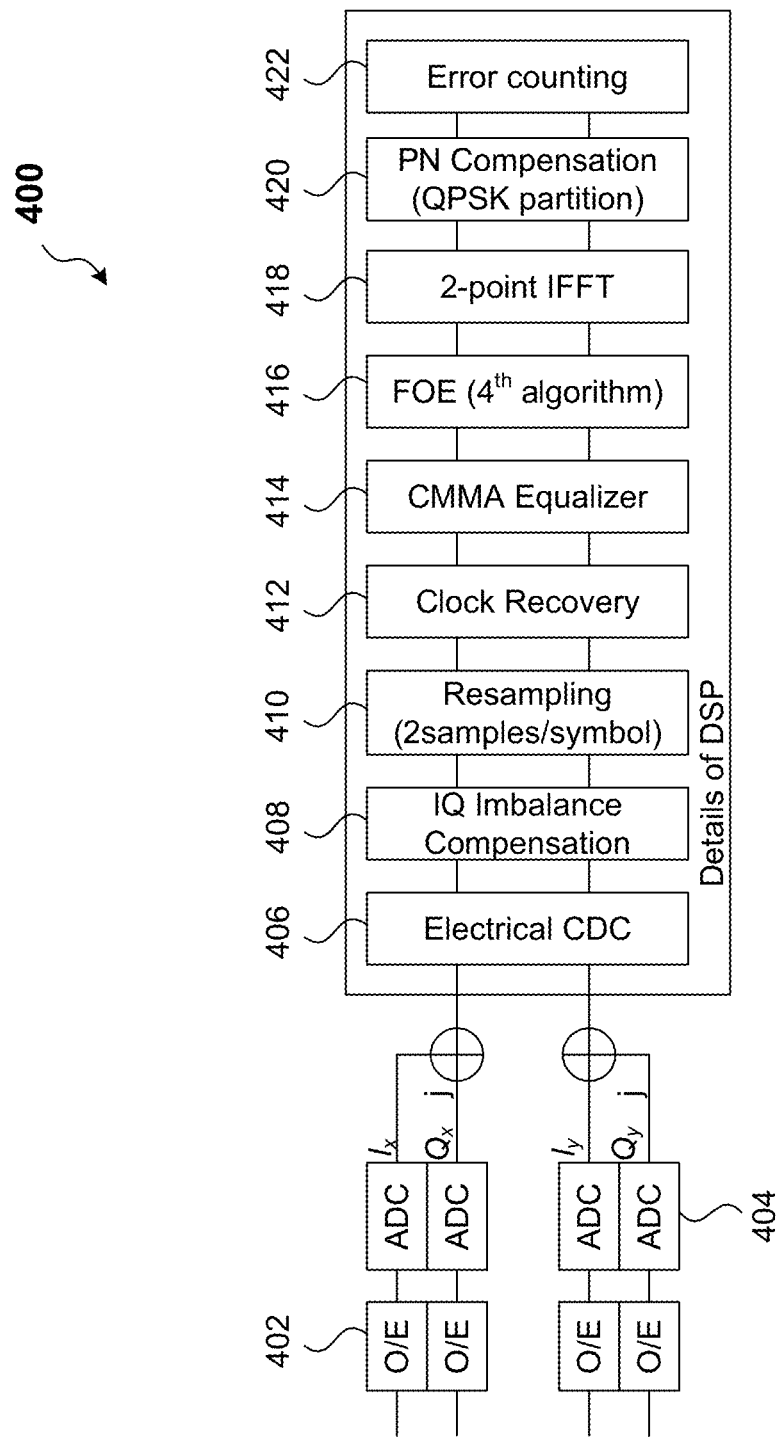
FIG. 4 is a block diagram depiction of an example of digital signal processing performed in a communication receiver.

FIG. 4 depicts an example of various signal processing tasks 400 performed digitally for receiver processing of the dual-subcarrier 16QAM OFDM signal. At the receiver, the Dual-subcarrier 16QAM-OFDM can be equalized with a CMMA method, such as the 49QAM-based CMMA, without any additional spectral overhead. After integrated receiver (402, for optical to electrical conversion and 404 for analog to digital conversion) corresponding to I and Q components of x- and y-polarized signals), for verifying performance results, four signal components $I_x$, $Q_x$, $I_y$ and $Q_y$ may be captured by a real-time oscilloscope with 80-GSa/s sample rate. The four signal components may be processed through a T/2-spaced time-domain finite impulse response (FIR) filter that is used for chromatic dispersion compensation (CDC) 406, where the filter coefficients are calculated from the known fiber CD transfer function using the frequency-domain truncation method. An IQ imbalance compensation module 408 may operate on the output of the Electrical CDC filter 406 to suppress or eliminate the imbalance between I and Q components of the received signals. A resampling module 410 may be used to resample the received signals based on the results of calculation of a clock recover module 412.

An Equalizer module 414 (labeled as cascaded multi-modulus algorithm CMMA) is used to retrieve the modulus of the PDM dual-subcarrier 16QAM-OFDM like a 49QAM signal and to realize polarization de-multiplexing. The subsequent step 416 is to realize the frequency offset estimation (FOE), with 4th-power algorithm. After these procedures, the IFFT module 418 is used to convert the 49QAM signal in the time domain into two 16QAM signals in the frequency domain via a 2-point IFFT transform. QPSK partition algorithm is used to realize the carrier phase estimation (CPE) and then the bit-error ratio (BER) can also be obtained with the BER counting. As blind equalization is applied for dual-subcarrier 16QAM-OFDM signal, there is no overhead and the capacity is 128 Gbit/s. In the results shown in this document, the BER is counted over $20\times10^6$ bits (20 data sets, and each set contains $10^6$ bits).

Briefly, the CMMA algorithm could be operated upon a 4 symbol QAM constellation, which could be considered mathematically to be a 4 Quadrature Phase Shift Keying (4QPSK) signal. When the 4QPSK signal is passed through a spectral shaping filter, e.g., two electrical low-pass filters on the two quadrature electrical signals (I and Q) or an optical bandpass filter after optical QPSK/QAM modulation, the resulting signal can be considered to be a multi-constellation point signal (QPSK or QAM) (see listing in FIG. 2). The multi-point symbol constellation can then be recovered using a CMMA algorithm. Further details of example implementations of CMMA can be found in "Multi-Modulus Blind Equalizations for Coherent Quadrature Duobinary Spectrum Shaped PM-QPSK Digital Signal Processing," by Zhang et al, published in Journal of LightWave Technology, vol. 31, No. 7, Apr. 1, 2013, which is incorporated by references in its entirety herein.

Figure 5:
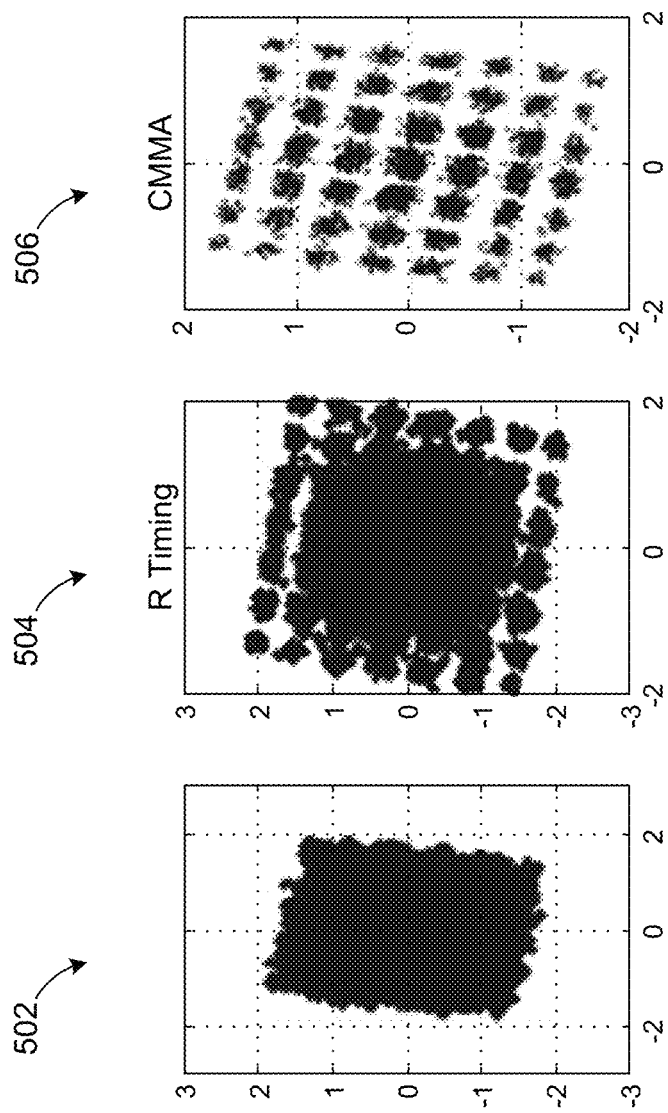
FIG. 5 depicts examples of signal constellations at various stages of processing a received single polarization dual subcarrier 16 QAM (Quadrature Amplitude Modulated) in a receiver apparatus.

In the single polarization dual-subcarrier 16QAM-OFDM transmission and reception, the optical source in the transmitter and receiver can be set to be the same ECL and the linewidth of this ECL is 400 Hz, which means that there is no frequency offset and negligible phase noise during the reception of the single polarization dual-subcarrier 16QAM-OFDM signal. FIG. 5 depicts example of the 49QAM signal (502) after re-timing (504) and CMMA (506). The constellations rotate due to the slight phase noise.

Figure 6:
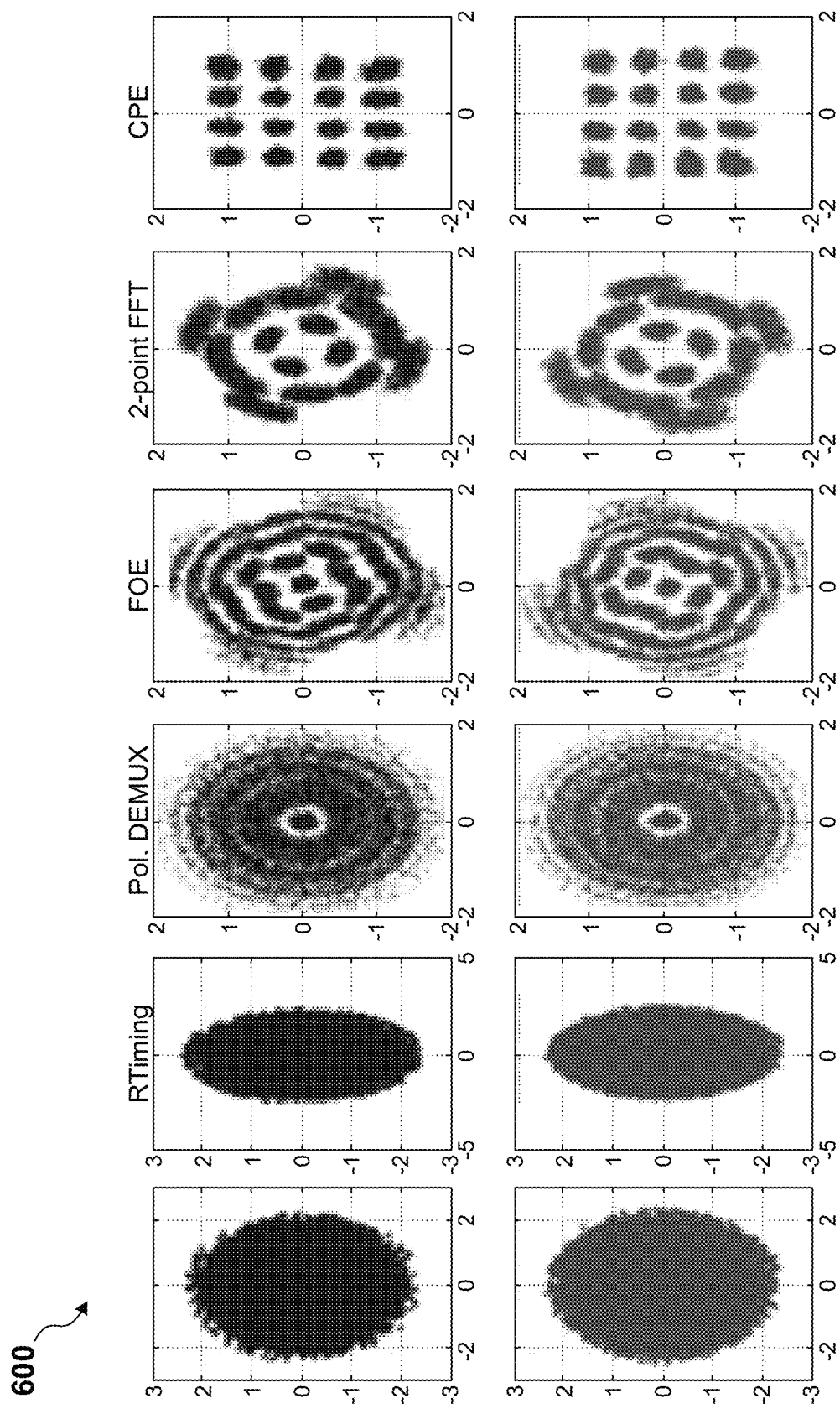
FIG. 6 depicts examples of signal constellations at various stages of processing a received polarization division multiplexed (PDM), dual subcarrier 16 QAM signal in a receiver apparatus.

FIG. 6 shows examples of constellations in different stages of DSP for PDM dual-subcarrier 16QAM-OFDM with OSNR of 28 dB in different stages of DSP, which is described in detail in FIG. 4. The FOE module 416 is implemented before 2-point FFT (418) to mitigate possible spread of noise induced by frequency offset estimation. The CPE is achieved after 2-point FFT with QPSK partition algorithm.

Figure 7:
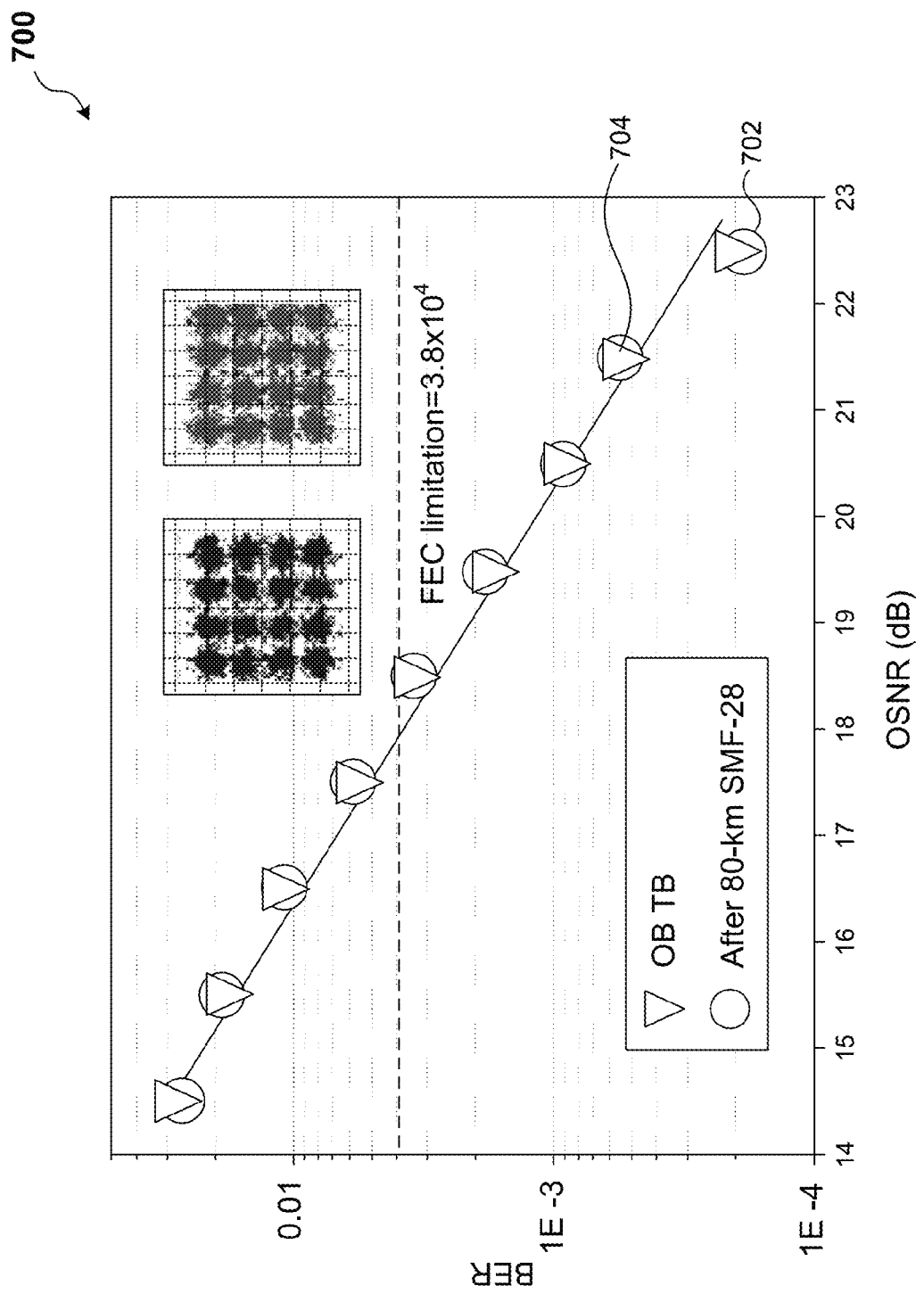
FIG. 7 depicts example bit error rate (BER) performance observed in an example embodiment as a function of Optical Signal to Noise Ratio (OSNR) of the transmitted signal.

FIG. 7 shows an example of the measured BER of 16-Gbaud dual-subcarrier 16QAM-OFDM signal versus OSNR. There is nearly no OSNR penalty observed after 80-km SMF-28 transmission (702) compared to the back-to-back configuration (704). The BER for the 128-Gbit/s PDM dual-subcarrier 16QAM-OFDM signal is less than the pre-forward-error-correction (7% overhead) threshold of $3.8\times10^{-3}$ when the OSNR is higher than 18 dB after 80-km SMF-28 transmission. The constellations of 16-Gbaud PDM Dual-subcarrier 16QAM-OFDM signal after phase recovery with OSNR of 19 dB after 80-km SMF-28 transmission are shown in the insets of FIG. 7.

In the OBTB case (704), a wavelength selective switch (WSS) can be used to adjust the bandwidth of channel to find the OSNR penalty for the 128-Gbit/s dual-subcarrier 16QAM-OFDM signal transmission with different optical channel bandwidth.

Figure 8:
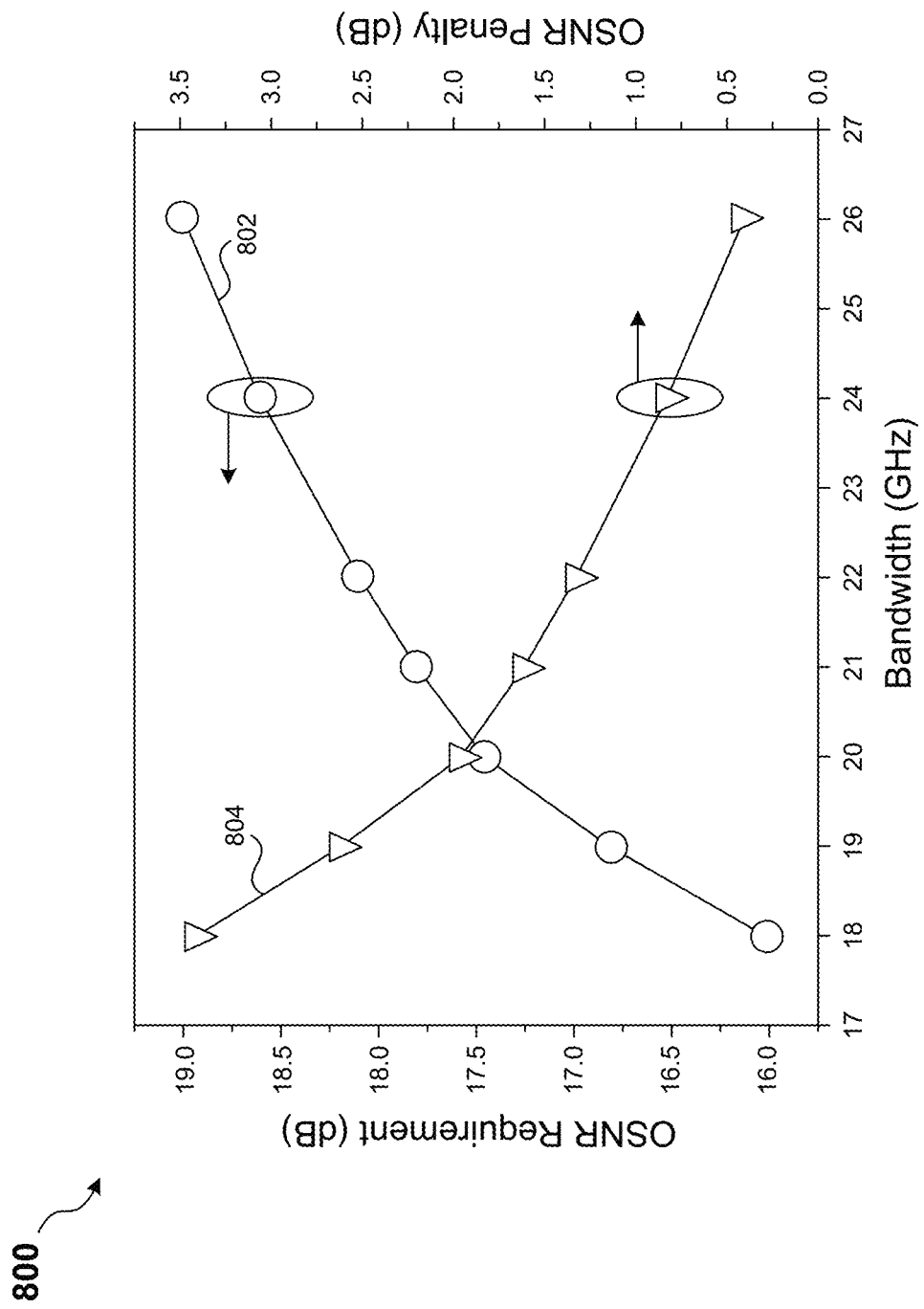
FIG. 8 depicts an example of back-to-back (BTB) OSNR margin and OSNR penalty for a wavelength selective switch (WSS) used in an optical communication system.

FIG. 8 shows a graphical example 800 of measured BTB OSNR requirement (804) and OSNR penalty (802) versus bandwidth of WSS. As can be seen from curve 802, the OSNR penalty increases rapidly when the optical channel bandwidth decreases. Because dual-subcarrier 16QAM-OFDM demonstrates as a 49QAM in the time domain and such a high order QAM may be vulnerable to the high frequency attenuation. It is possible that the constellation density of dual-subcarrier 16QAM-OFDM makes it hard overcome the high frequency attenuation when the channel bandwidth is insufficient. A 0.6-dB OSNR penalty is observed when the bandwidth of channel is set at 25 GHz.

In some embodiments, 16-Gbaud PDM dual-subcarrier 16QAM-OFDM signal transmission and reception is possible with blind equalization by treating the received signal as a 49QAM signal. The 128-Gbit/s PDM dual-subcarrier 16QAM-OFDM signal can be transmitted over 80-km SMF-28 without penalty and 0.6-dB OSNR penalty when the bandwidth of channel is set at 25 GHz.

Figure 9:
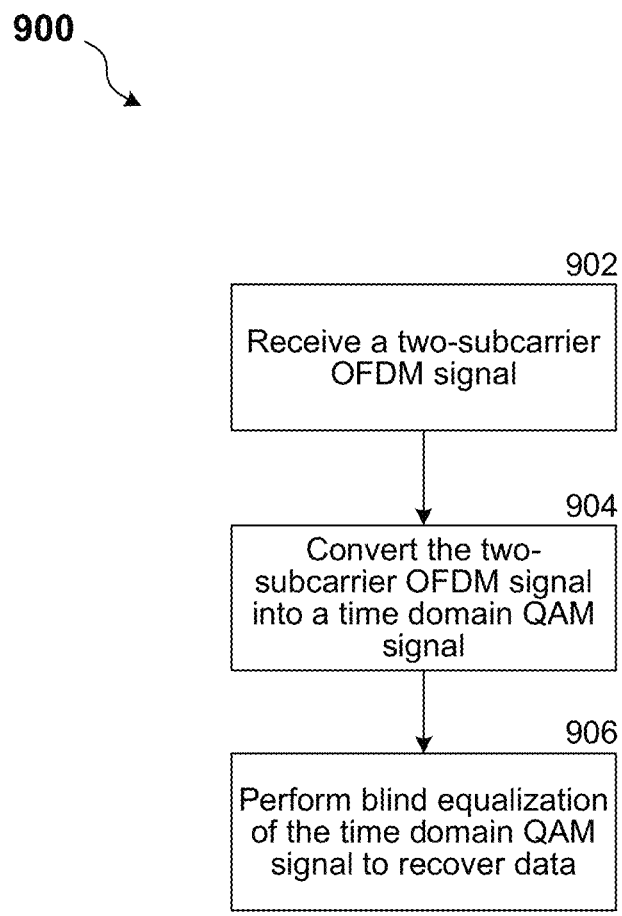
FIG. 9 shows an example flowchart of a process of optical communication.

FIG. 9 is a flowchart representation of an example process 900 of optical communication. The process 900 can be implemented in an optical signal receiver electronics, e.g., in apparatus 102, 106.

At 902, the process 900 includes receiving the two-subcarrier, or dual subcarrier, OFDM signal. The signal may be received via a glass or plastic optical fiber transmission medium. In some embodiments, the received two-subcarrier OFDM signal may include two PDM components, each of which comprises a two-subcarrier OFDM signal component.

At 904, the process 900 includes converting the two-subcarrier OFDM signal into a time domain Quadrature Amplitude Modulation (QAM) signal. The conversion may include transforming the two-subcarrier OFDM using an inverse Fourier transform (e.g., module 418).

At 906, the process 900 includes performing blind equalization of the time domain QAM signal to recover the data. In some embodiments, the blind equalization may be performed using a cascaded multi-modulus algorithm (CMMA) which includes performing channel equalization of the received two-subcarrier OFDM signal to obtain a set of channel estimation coefficients and a stream of symbols, partitioning, based on a modulus of the stream of symbols, the stream of symbols into multiple partitions, estimating a carrier frequency offset based on the partitioned stream of symbols, and recovering a phase of the received two-subcarrier OFDM signal using a maximum likelihood algorithm. In addition, the CMMA may further include rotating at least some constellation points. The rotating operation may be performed during the operation of estimating the carrier frequency offset or during recovering the phase of the signal.

Figure 10:
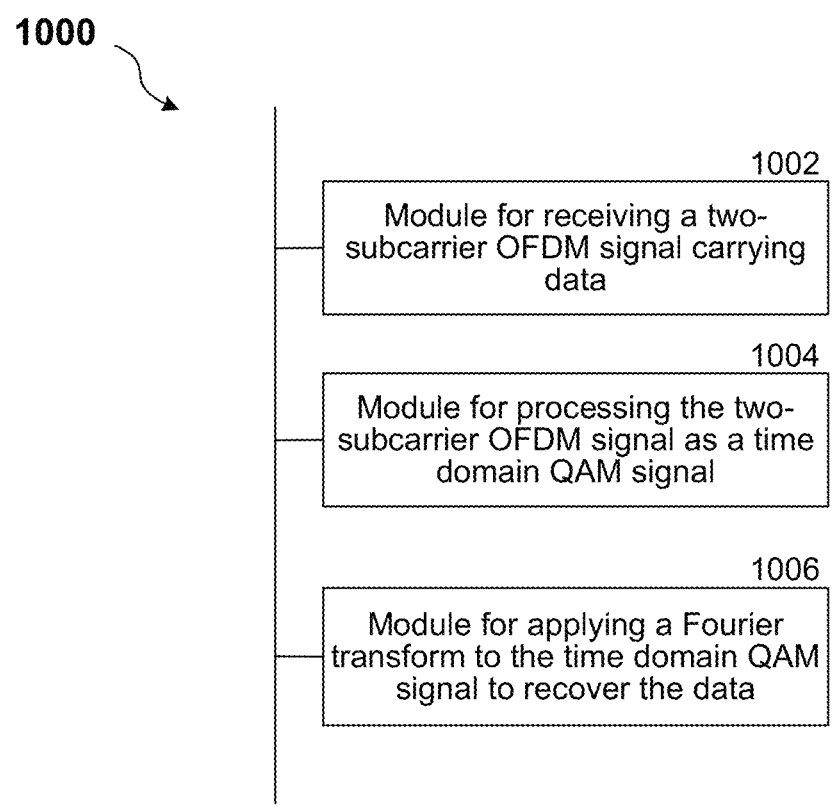
FIG. 10 is a block diagram of an example of an optical communication apparatus.

FIG. 10 is an example of an apparatus 1000 for optical communication reception. The receiver 1000 includes an optical receiver module 1002 that receives the two-subcarrier OFDM signal. The receiver 1000 includes a receiver processing module 1004 that processes the two-subcarrier OFDM signal as a QAM signal to generate a modulus signal. The receiver 1000 includes a transform module 1006 that applies an orthogonal transform to the modulus signal to recover the data.

In some embodiments, the apparatus 1000 may include a constellation rotation module that rotates at least some constellation points. In some embodiments, the constellation rotation module may perform the rotating operation during the operation of estimating the carrier frequency offset. The constellation rotation module may perform the rotating operation during the operation of recovering the phase of the signal. In some embodiments, the apparatus 1000 includes a polarization division demultiplexing module to de-multiplex the two-subcarrier OFDM signal. In some embodiments, the transform module 1006 includes a transform module that performs orthogonal transformation of the two-subcarrier OFDM signal, e.g., inverse Fourier transformation. In some embodiments, each subcarrier of the two-subcarrier OFDM signal is modulated using a QAM constellation comprising more than 4 symbols. For example, 16QAM, 32QAM, 64QAM and so on may be used based on the optical communication system and the transmission quality of the optical medium over which the signals travel.

In some embodiments, an optical communication system includes an optical transmission apparatus transmits, over the optical transmission medium, a two-subcarrier orthogonal frequency division multiplexed (OFDM) signal in which each subcarrier is modulated using a Quadrature Amplitude Modulation (QAM) constellation without transmitting a training sequence and a pilot signal and an optical receiver apparatus that receives the two-subcarrier OFDM signal, processes the two-subcarrier OFDM signal as a QAM signal to generate a modulus signal, and applies an orthogonal transform to the modulus signal to recover the information bits.

It will be appreciated that various techniques are disclosed for achieving high data throughput in optical communication in which two-subcarrier OFDM signals are used without using pilot tones or training sequences.

It will further be appreciated that the transmission and reception of 128-Gbit/s polarization-division-multiplexed (PDM) dual-subcarrier 16QAM-OFDM with blind equalization like a 49QAM signal is disclosed. The performance comparison between optical back to back (OBTB) and after 80-km single-mode fiber-28 (SMF-28) transmission is performed, and the results show that there is no power penalty observed. We also measure optical signal to noise ratio (OSNR) penalty versus the bandwidth of the channel and the experimental results show 0.6-dB OSNR penalty is observed when the bandwidth of channel is set at 25 GHz.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for recovering data from a two-subcarrier orthogonal frequency division multiplexed (OFDM) signal in which each subcarrier is modulated using a 16 Quadrature Amplitude Modulation (QAM) constellation, comprising:
    receiving the two-subcarrier OFDM signal;
    converting the two-subcarrier OFDM signal into a time domain 49 QAM signal; and
    performing blind equalization of the time domain 49 QAM signal using a cascaded multi-modulus algorithm (CMMA) to recover the data.

2. The method of claim 1, wherein the CMMA comprises:
    performing channel equalization of the received two-subcarrier OFDM signal to obtain a set of channel estimation coefficients and a stream of symbols;
    partitioning, based on a modulus of the stream of symbols, the stream of symbols into multiple partitions;
    estimating a carrier frequency offset based on the partitioned stream of symbols; and
    recovering a phase of the received two-subcarrier OFDM signal using a maximum likelihood algorithm.

3. The method of claim 2, further including:
    rotating at least some constellation points.

4. The method of claim 3, wherein the rotating operation is performed during the operation of estimating the carrier frequency offset.

5. The method of claim 3, wherein the rotating operation is performed during the operation of recovering the phase of the signal.

6. The method of claim 1, wherein the receiving the two-subcarrier OFDM signal includes:
    polarization division demultiplexing the two-subcarrier OFDM signal.

7. The method of claim 1, wherein the converting the two-subcarrier OFDM signal into the time domain QAM signal includes:
    transforming the two-subcarrier OFDM signal using an inverse Fourier transform.

8. The method of claim 1, wherein each subcarrier of the two-subcarrier OFDM signal is modulated using a QAM constellation comprising more than 4 symbols.

9. An optical receiver apparatus for recovering data from a two-subcarrier orthogonal frequency division multiplexed (OFDM) signal in which each subcarrier is modulated using a 16 Quadrature Amplitude Modulation (QAM) constellation, comprising:
    an optical receiver module that receives the two-subcarrier OFDM signal;
    a receiver processing module that processes the two-subcarrier OFDM signal as a 49 QAM signal using a cascaded multi-modulus algorithm (CMMA) to generate a modulus signal; and
    a transform module that applies an orthogonal transform to the modulus signal to recover the data.

10. The apparatus of claim 9, wherein the CMMA comprises:
    performing channel equalization of the received two-subcarrier OFDM signal to obtain a set of channel estimation coefficients and a stream of symbols;
    partitioning, based on a modulus of the stream of symbols, the stream of symbols into three partitions;
    estimating a carrier frequency offset based on the partitioned stream of symbols; and
    recovering a phase of the received two-subcarrier OFDM signal using a maximum likelihood algorithm.

11. The apparatus of claim 10, further including:
a constellation rotation module that rotates at least some constellation points.

12. The apparatus of claim 10, wherein the constellation rotation module performs the rotating operation during the operation of estimating the carrier frequency offset.

13. The apparatus of claim 10, wherein the constellation rotation module performs the rotating operation during the operation of recovering the phase of the signal.

14. The apparatus of claim 10, further including:
a polarization division demultiplexing module to de-multiplex the two-subcarrier OFDM signal.

15. The apparatus of claim 9, wherein the transform module includes:
a Fourier transform module that performs a Fourier transformation of the two-subcarrier OFDM signal.

16. The apparatus of claim 9, wherein each subcarrier of the two-subcarrier OFDM signal is modulated using a QAM constellation comprising more than 4 symbols.

17. An optical communication apparatus for recovering data from an optical two-subcarrier orthogonal frequency division multiplexed (OFDM) signal in which each subcarrier is modulated using a 16 Quadrature Amplitude Modulation (QAM) constellation, comprising:
an optical receiver module that receives the optical two-subcarrier OFDM signal and converts the optical two-subcarrier OFDM signal into an electrical two-subcarrier OFDM signal;
a memory that stores instructions; and
a processor that reads the instructions from the memory and implements a method of reception of the electrical two-subcarrier OFDM signal, the method causing the processor to:
receive the electrical two-subcarrier OFDM signal;
convert the electrical two-subcarrier OFDM signal into a time domain 49 QAM signal; and
perform blind equalization of the time domain 49 QAM signal using a cascaded multi-modulus algorithm (CMMA) to recover the data.

18. The apparatus of claim 17, wherein the CMMA comprises:
perform channel equalization of the received two-subcarrier OFDM signal to obtain a set of channel estimation coefficients and a stream of symbols;
partition, based on a modulus of the stream of symbols, the stream of symbols into multiple partitions;
estimate a carrier frequency offset based on the partitioned stream of symbols; and
recover a phase of the received two-subcarrier OFDM signal using a maximum likelihood algorithm.

19. The apparatus of claim 18, wherein the method further causes the processor to:
rotate at least some constellation points.

20. The apparatus of claim 19, wherein the rotating operation is performed during performing the operation of estimating the carrier frequency offset.

21. The apparatus of claim 19, wherein the rotating operation is performed during performing the operation of recovering the phase of the signal.

22. The apparatus of claim 17, wherein each subcarrier of the two-subcarrier OFDM signal is modulated using a QAM constellation comprising more than 4 symbols.

23. An optical communication system, comprising:
an optical transmission apparatus transmits, over the optical transmission medium, a two-subcarrier orthogonal frequency division multiplexed (OFDM) signal in which each subcarrier is modulated using a 16 Quadrature Amplitude Modulation (QAM) constellation comprising information bits without transmitting a training sequence and a pilot signal; and
an optical receiver apparatus that:
receives the two-subcarrier OFDM signal;
processes the two-subcarrier OFDM signal as a 49 QAM signal using a cascaded multi-modulus algorithm (CMMA) to generate a modulus signal; and
applies an orthogonal transform to the modulus signal to recover the information bits.

24. The system of claim 23, wherein the CMMA comprises:
performing channel equalization of the received two-subcarrier OFDM signal to obtain a set of channel estimation coefficients and a stream of symbols;
partitioning, based on a modulus of the stream of symbols, the stream of symbols into three partitions;
estimating a carrier frequency offset based on the partitioned stream of symbols; and
recovering a phase of the received two-subcarrier OFDM signal using a maximum likelihood algorithm.

25. The system of claim 24, wherein the optical receiver apparatus further:
rotates at least some constellation points.

26. The system of claim 25, wherein the rotating operation is performed during the operation of estimating the carrier frequency offset.

27. The system of claim 25, wherein the rotating operation is performed during the operation of recovering the phase of the signal.

* * * * *